United States Patent
Bielawa

[11] 3,814,351
[45] June 4, 1974

[54] COAXIAL ROTOR YAW CONTROL
[75] Inventor: Richard L. Bielawa, Vernon, Conn.
[73] Assignee: United Aircraft Corporation, East Hartford, Conn.
[22] Filed: Dec. 6, 1972
[21] Appl. No.: 312,450

[52] U.S. Cl............ 244/17.19, 244/17.23, 416/87
[51] Int. Cl............................................. B64c 27/10
[58] Field of Search........... 244/17.23, 17.21, 17.19, 244/17.25, 17.11, 7 A, 7 R; 416/88, 89, 128, 129, 87, 20, 123, 101, 127

[56] References Cited
UNITED STATES PATENTS

| | | | |
|---|---|---|---|
| 2,120,168 | 6/1938 | Ash, Jr................................ | 416/88 |
| 2,456,485 | 12/1948 | Bendix........................... | 416/129 X |
| 2,835,331 | 5/1958 | Ryan et al........................ | 416/129 |
| 2,845,132 | 7/1958 | Heckman..................... | 244/17.25 X |
| 3,249,160 | 5/1966 | Messerschmitt..................... | 416/87 |

FOREIGN PATENTS OR APPLICATIONS
648,345  10/1962  Italy................................ 244/17.23

Primary Examiner—Milton Buchler
Assistant Examiner—Paul E. Sauberer
Attorney, Agent, or Firm—Donald F. Bradley; Maurice B. Tasker

[57] ABSTRACT

A helicopter has coaxial counterrotating rotors having telescoping blade tip portions which are normally partially extended. Pilot operated means is provided for differentially extending and retracting the blade tip portions of the two rotors producing differential torque between rotors for yaw control. Pilot operated means is also provided for simultaneously retracting the tip portions of the blades of both rotors.

9 Claims, 4 Drawing Figures

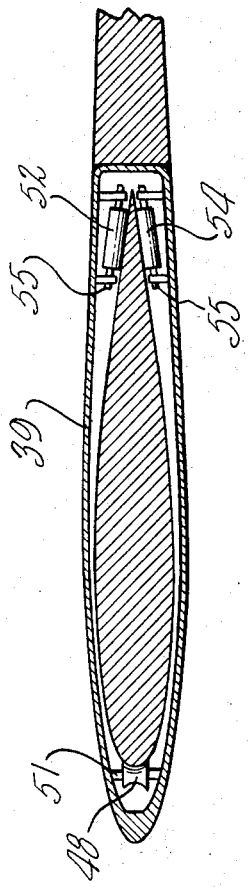
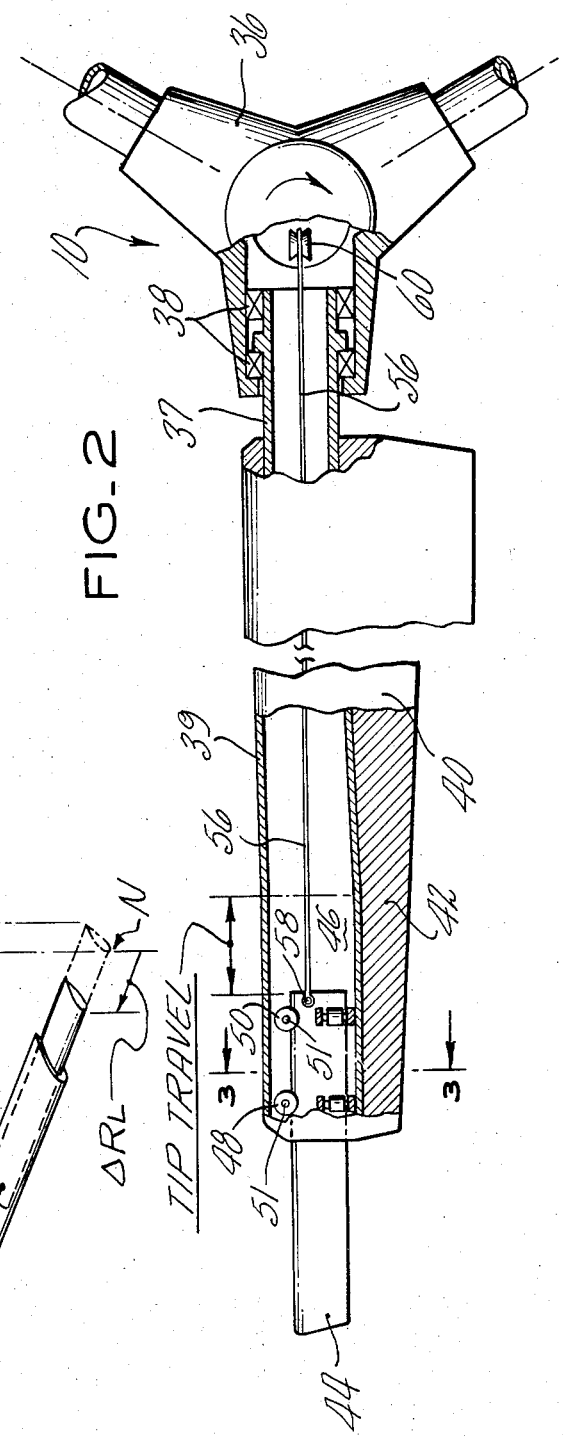
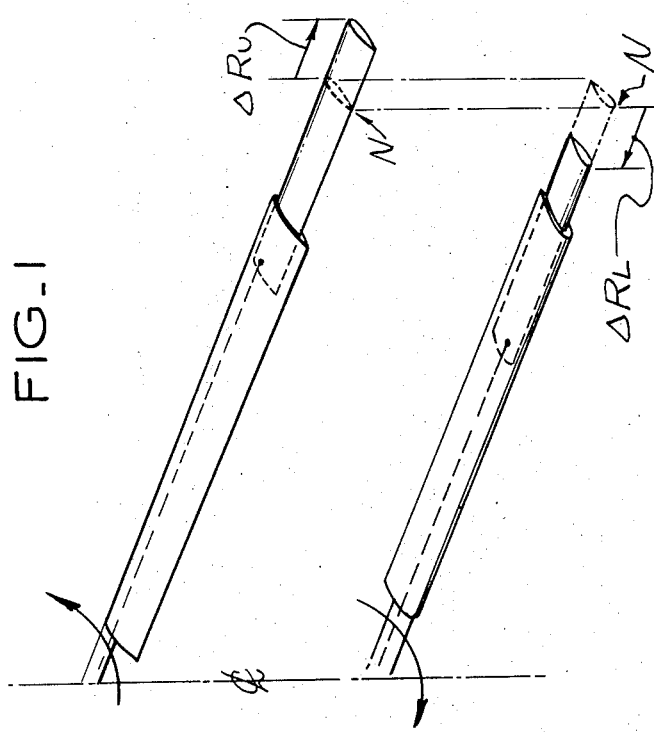

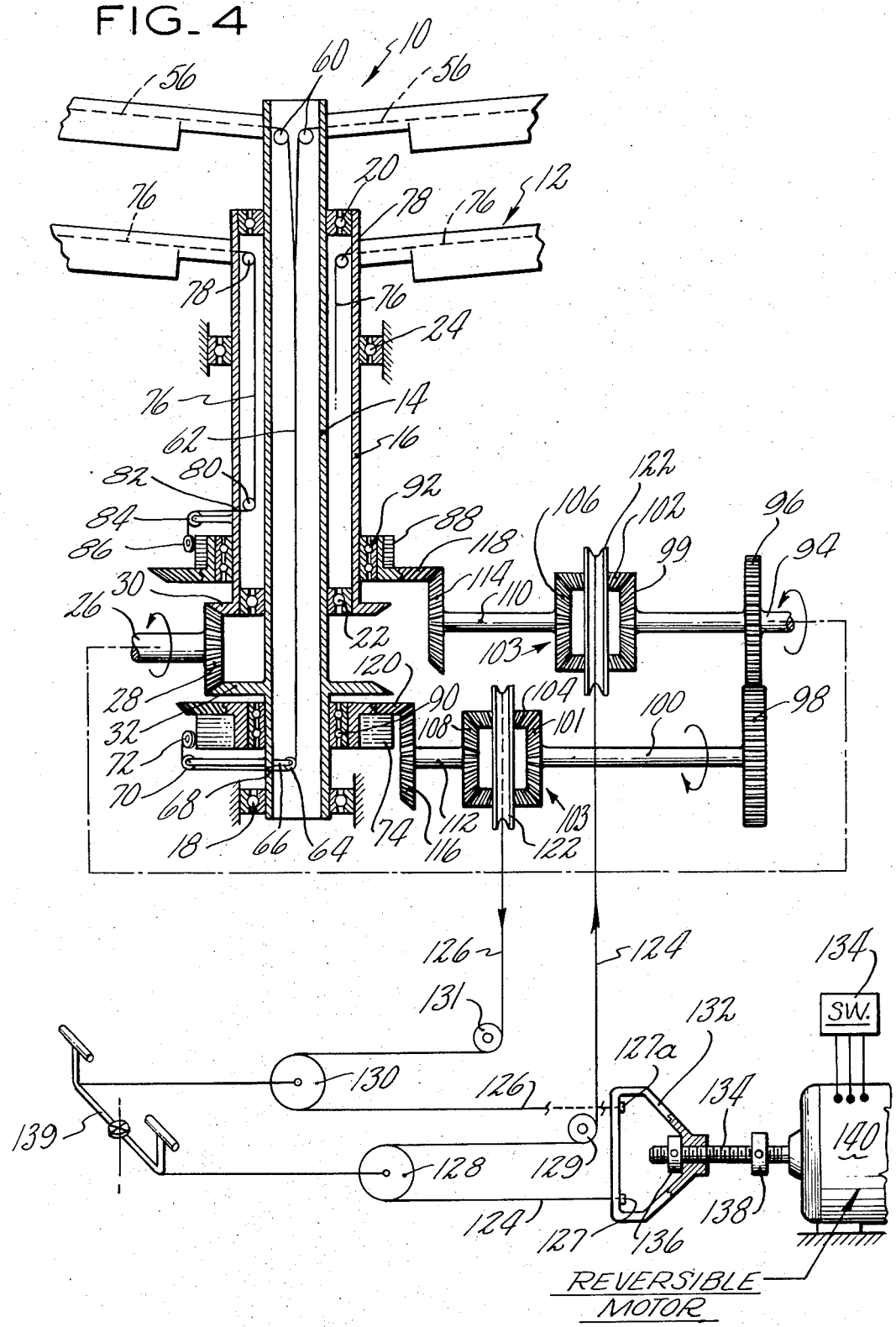

COAXIAL ROTOR YAW CONTROL

BACKGROUND OF THE INVENTION

1. Field of the Invention

This invention relates to helicopters having coaxial counterrotating rotors and particularly to improved means for providing yaw control for such helicopters which is capable of producing adequate control in all modes of flight including autorotation flight. More specifically the invention is concerned with coaxial counterrotating rotors having telescoping blade tip portions which are normally partially extended in which the blades of the upper and lower rotors can be differentially extended and retracted to create a resultant net torque between the rotors.

2. Description of the Prior Art

Various devices have been proposed for obtaining yaw control in coaxial counterrotating helicopters. One consists in differentially varying the collective pitch of the two rotors. This, however, does not supply sufficient yawing moments for control when in autorotation. Also it causes an undesirable reversal of control in autorotation flight and it may not provide enough control power in powered descents. Another consists in providing tip brakes. The brakes, which are normally retracted, are extended on the blades of one rotor while the brakes on the other rotor remain inactive, resulting in a torque between rotors. This form of yaw control is shown in the U.S. Pat. to Ryan, No. 2,835,331, issued May 20, 1958. Tip brakes are undesirable because they produce drag only and have very high power consumption and high loss of tip section aerodynamic efficiency. Still another method of obtaining yaw control in coaxial counterrotating helicopters is to differentially control the speed of the two rotors. This scheme, of course, requires auxiliary power in case of main rotor power failure and is otherwise potentially difficult to implement.

Other patents, although not concerned with torque control of coaxial rotors, have shown blades having telescoping sections. Examples of these are: T. Ash, Jr. U.S. Pat. No. 2,120,168, issued June 7, 1938; A. V. Kisovec U.S. Pat. No. 3,297,094, issued Jan. 10, 1967; and V. Isacco U.S. Pat No. 2,713,393, issued July 19, 1955.

Other patents dealing with coaxial semi-rigid and rigid rotors, the type shown in this application are: S. Hiller, Jr. U.S. Pat. No. 2,481,748, issued Sept. 13, 1949 and R. R. Bergquist et al. U.S. Pat. No. 3,409,249, issued Nov. 5, 1968.

SUMMARY OF THE INVENTION

It is an object of this invention to provide improved means for yaw control of a coaxial rotor helicopter which requires low engine power and yet provides adequate yaw control power.

Another object of this invention is to provide such yaw control which will not be subjected to control reversal in autorotation flight.

Further objects of this invention are to provide such a system which uses rotor kinetic energy, i.e., no auxiliary power needed for power out conditions; which results in aerodynamically clean blades; which eliminates tail rotors and yaw fans; and which is simple to implement, involving lineal motions of cables in tension.

More particularly it is an object of this invention to provide yaw control in coaxial counterrotating rotors by providing telescoping blade tip portions which are differentially operated to extend the tip portions of one rotor while retracting the tip portions of the other rotor.

A further object of this invention is to provide pilot operative means for simultaneously retracting the tip portions of the blades of both rotors during high speed flight when more efficient yaw control is available from a vertical tail surface.

These and other objects and advantages of this invention will be pointed out or will be obvious from the following detailed description of the accompanying drawings.

BRIEF DESCRIPTION OF THE DRAWINGS

FIG. 1 is a pictorial view of one rotor blade for each of the upper and lower rotors, showing the differentially telescoping tip portions of these blades in yaw producing positions;

FIG. 2 is a top plan view of a rotor blade embodying the invention, parts being broken away and parts being shown in section or omitted for purposes of illustration;

FIG. 3 is a section taken on line 3—3 of FIG. 2; and

FIG. 4 is a somewhat schematic showing of the control means for actuating the blade tip portions of the two rotors.

DESCRIPTION OF THE PREFERRED EMBODIMENT

This invention is illustrated in connection with coaxial counterrotating rotors for a helicopter in which 10 and 12 are the upper and lower rotors, respectively. These are rigidly mounted at the upper ends of inner and outer rotor drive shafts 14 and 16 which are rotatably supported on fixed structure of the helicopter on antifriction bearings. Inner shaft 14 is supported at its lower end by a thrust carrying bearing 18 and adjacent its upper end by a bearing 20. Outer shaft 16 is supported at its lower end by a bearing 22 between the two shafts and at its upper end by a thrust carrying bearing 24.

Shafts 14 and 16 are driven at the same speed, but in opposite directions from an engine driven shaft 26 which carries a bevel gear 28 meshing with cooperating bevel gears 30, 32 on outer and inner drive shafts 16, 14 of the two rotors. Since gears 30, 32 mesh with driving gear 28 on opposite sides of the latter the coaxial rotor drive shafts are driven in opposite directions.

The rotor blades herein are rigidly mounted, but the invention is equally applicable to rotors which are either partially or fully articulated. FIG. 2 is a plan view of the upper rotor which consists of a hub 36 fixed on the upper end of drive shaft 14 in which the circular root portions 37 of three blades are mounted on feathering bearings 38 for pitch changing movements about their longitudinal axes.

Each blade comprises a hollow spar 39 which forms the leading edge and is the main strength member of the blade and a tapered trailing edge portion 40 which completes the airfoil contour of the blade. Herein the portion 40 is filled with a suitable honeycomb material 42 provided with a fiberglass covering. Each blade has a tip portion 44 of reduced chord which has one end inserted into a cavity 46 in the outboard end of the blade spar in which it is freely slidable, being supported by two rollers 48, 50 on the spar mounted at spaced points along its leading edge on pivots 51 and by rollers 52, 54 mounted on pivots 55 carried by the spar in position to engage the top and bottom tapered surfaces of tip portion 44 adjacent its trailing edge. Portion 44 is shown in FIG. 2 in its extended position but normally it is in a mid position in which it can be either extended or retracted, as will be explained hereinafter.

The extension and retraction of each tip portion 44 of the upper rotor is controlled by a cable or flexible strap 56 which is attached to the inboard end of the tip portion at 58 and passes through the hollow spar to a pulley 60 mounted in the rotor hub by which the cable is directed downward through the hollow drive shaft 14. Inside the drive shaft the three cables from the three blades of the upper rotor are combined into a single cable 62 which extends over a pulley 64 supported on a bracket 66 on the inner wall of shaft 14, through an aperture 68 in the shaft 14 and thence over pulleys 70, 72, both of which are carried by brackets on shaft 14. Pulley 72 is arranged to direct cable 62 tangentially to a cable reel 74 on which a suitable length of cable is wound. Cable reel 74 is adapted to be driven at the same speed as shaft 14, as will be later described.

The tip portions 44 of the lower rotor are similarly controlled by cables 76 which pass over pulleys 78 carried by outer drive shaft 16. These cables pass separately over pulleys 80 carried by brackets on shaft 16, through apertures 82 in the shaft and over pulleys 84, 86, the latter of which directs the cable tangentially to cable reel 88 on which the cables are wound. While only one cable 76 has been shown completely, it will be understood that the other two blade cables are provided with identical pulleys to direct them onto cable reel 88. Reel 88 is rotated at the same speed as drive shaft 16 and is of the same diameter as cable reel 74 associated with the upper rotor.

While cable reels 74, 88 normally rotate at the same speed as their associated drive shafts, they are mounted on their drive shafts 14 and 16 for limited independent rotation on bearings 90, 92. It is this limited rotational adjustment of these cable reels which is used to control the extension and contraction of the blade tip sections of the rotors.

As previously noted, power input shaft 26 drives the concentric rotor drive shafts 14, 16 at equal speeds and in opposite directions. This same input shaft normally drives the cable reels 74, 88 at the same speed as the shafts 14, 16 and in the same directions. Herein to facilitate illustration the drive for cable reels 74, 88 has been shown as driven from a separate input shaft 94. It will be understood, however, that shaft 94 rotates at the same speed as input shaft 26 and may be the same shaft or be driven directly therefrom as shown.

Referring to FIG. 4, input shaft 94 has a gear 96 thereon which drives a gear 98 of equal diameter on shaft 100. Shafts 94 and 100 have bevel gears 99, 101 which each engage bevel gears 102, 104 on differential spiders 103. Gears 102, 104 mesh with bevel gears 106, 108 on shafts 110, 112 which carry bevel gears 114, 116 meshing with gears 118, 120 on cable reels 88, 74 to drive them in the same directions and at the same speeds as the shafts the latter are mounted upon.

Each differential spider 103 carries a cable reel, or pulley, 122 to which cables 124, 126 are attached, leading over pulleys 129, 131 to pulleys 128, 130. Cables 124, 126 then pass over pulleys 128, 130 and are attached at 127, 127a to a reciprocable frame 132 which forms a support, normally fixed, for the ends of cables 124, 126 when the frame is fully extended, as shown. Pulleys 128, 130 are bodily movable by rudder pedals 139 which are connected to pulleys 128, 130 at their centers.

Frame 132 is reciprocated by a three position, normally open motor-reversing switch 134 which may be located in the pilot's compartment and which controls the reciprocation of frame 132 by means of a threaded extension 134 on the shaft of motor 140. Extension 134 is threaded into one end of frame 132. Stops 136, 138 are provided on the threaded extension to limit the reciprocatory movement of frame 132.

The above arrangement has the advantage that a given movement of the rudder pedals, which is of necessity a limited distance, results in a linear movement of twice that distance of cables 126, 124 and consequently an equally increased movement of tip portion cables 56, 76.

In normal flight with no yaw control being used, the upper and lower rotors are rotating at equal speeds in opposite directions as indicated by curved arrows in FIG. 1 and the blade tip portions 44 of both rotors are in their normal positions in which they project slightly from the main rotor blade portions. The points of normal extension of the tip portions is indicated by the letter N in FIG. 1 and is the same for both rotors. As the rotors are driven by their drive shafts 14, 16, the cable reels 74, 88 are also driven with them in the same direction and at the same speed, since power input shaft 94 and input shaft 26 are rotating at the same speed.

To obtain yaw control the appropriate rudder pedal is depressed which extends one of cables 124, 126 and retracts the other, causing spools 122 on the two differential spiders 103 to rotate in opposite directions, one to wind up the cable(s) on one cable reel (74 or 88) and the other to slacken its cable(s). It will be understood that rotation of spools 122 adds an increment of rotation to the already rotating cable reels 74, 88 by rotating shafts 110, 112 to wind up the cable of one reel and slacken the cable of the other reel. The cables are held taut at all times, however, by the rotating tip portions which are constantly urged outward regardless of their axial position by centrifugal forces generated by the rotating blades.

Referring to FIG. 1, it will be noted that one rudder pedal has been depressed, causing the tip portions of the upper rotor blades to be extended radially a distance $\Delta R_U$ while the tip portions of the lower rotor blades have been retracted a distance $\Delta R_L$. This utilizes for yaw control the efficient aerodynamic operation of the rotor blade tip portions which generate torque principally by a rearward tilting of the local lift forces. Thus, torque due to both lift and drag is used which increases the amount of yaw control power available over devices which use blade tip brakes which generate only torque due to drag. The present invention employs the differential extensions of blade tip portions on the two rotors at constant pitch angles to maintain substantially constant both required engine power and combined system lift while creating unequal resulting torques for the two rotors. Thus ample yaw control is provided with low power loss, since rotor kinetic energy is utilized. The system utilizes the difference between two balancing rotor torques which are being used for thrust generation and does not use power which is not already used for lift. To obtain yaw control in the other direction the opposite rudder pedal is depressed resulting in the retraction of the upper blade tip portions and the extension of the lower blade tip portions. The following table indicates how the lift, yaw moment and absorbed power for the combined rotor system result from those same quantities for the upper and lower rotors separately. The quantities $L_o$, $Q_o$ and $\Omega$ are, respectively, the lift (thrust), the torque of each rotor before control application and the (constant) rotor speed. The quantities $R_u$, $L_u$, $Q_u$ and $R_L$, $L_L$, $Q_L$ are the blade radial extension, incremental lift and incremental torque for the upper and lower rotors, respectively:

|  | LIFT | YAW. MOM. | POWER |
|---|---|---|---|
| Upper rotor: | $L_o + \Delta L_U$ | $Q_o + \Delta Q_U$ | $\Omega(Q_o + \Delta Q_U)$ |
| Lower rotor: | $L_o - \Delta L_L$ | $-Q_o + \Delta Q_L$ | $\Omega(Q_o - \Delta Q_L)$ |
| Combined rotors: | Approx. $2L_o$ | $\Delta Q_U + \Delta Q_L$ | $\Omega(\Delta Q_U - \Delta Q_L) + 2\Omega Q_o$ or approx. $2\Omega Q_o$ |

The helicopter is provided with a manually trimmable vertical tail surface, not shown. Such a surface is shown in the Ryan U.S. Pat. No. 2,835,331 referred to previously and is adequate to provide yaw control for a helicopter in high speed flight. The pilot can, under these conditions of flight, close switch 134 to energize motor 140 for rotation in a direction to move frame 132 to the right in FIG. 4. This will retract both cables 124, 126 and retract the blade tip portions of both rotors simultaneously into their main blade sections to obtain more efficient high speed flight. The vertical tail surface, as well as the control mechanism for obtaining collective and cyclic blade pitch changes, has been omitted from the drawings as they do not directly concern this invention. However, these are shown in the Ryan U.S. Pat. No. 2,835,331 and reference is made to this patent in this connection.

The increased efficiency in high speed flight resulting from retraction of the blade tip portions arises from a reduced tip speed with its attendant reduction in compressibility losses on the advancing blade. This latter characteristic is especially attractive in coaxial rigid rotor applications where the performance characteristics are determined by efficient advancing blade operation, as explained in the Bergquist et al. U.S. Pat. No. 3,409,249 previously referred to.

It will be evident that, as a result of this invention, it is possible to obtain adequate yaw control power in a coaxial helicopter rotor system by the utilization of rotor kinetic energy with low power requirements. The system utilizes the difference between two balancing rotor torques which are being used efficiently for thrust generation. Thus the device of this invention does not use power which is not already used for lift. Also, actuation of the system utilizes the negative centrifugal force gradient. Upon balancing the centrifugal loads between the two rotor actuators, retraction of the extensible tips of one rotor assists in the extension of those of the other and vice versa. Furthermore, since the yaw control power for the device of this invention is generated only by the outboard sections of the blades and since in autorotation flight the outboard sections are torque absorbing, the device is free of control reversal.

The device of the present invention possesses other inherent characteristics which are advantageous. The device possesses a dynamic transient boost effect wherein Coriolis torques are generated in the favorable direction when the extensible portions of span are in motion. Thus rapidly applied controls will generate dynamic yawing moments, over and above the aerodynamic ones, which are proportional to the masses of the extensible portions and the rate of control application.

I wish it to be understood that I do not desire to be limited to the exact details of construction shown and described, for various obvious modifications will occur to a person skilled in the art.

I claim:

1. In a helicopter, coaxial counterrotating rotors, each having a plurality of load sustaining rotor blades, each blade having a main blade portion and a lift producing tip portion of airfoil section which is extensible and retractible axially of its main blade portion from a normal position in which it is partially extended from said main blade portion, and means for creating torque differential between said rotors including means operative by the pilot for effecting extension of the tip portions of the blades of either rotor and simultaneously retraction of the blade tip portions of the blades of the other rotor.

2. In a helicopter, upper and lower coaxial counterrotating rotors, each having blades provided with hollow spar members, means operative by the pilot in flight for providing yaw control for the helicopter, said means including lift producing blade tip portions which telescope within said hollow spar members, the tip portions of the blades of both rotors being in equal degrees of extension from said spar members when no yaw control is desired, and cables connected to said blade tip portions and extended through said hollow spar members for controlling the differential extension and retraction of the blade tip portions of the two rotors to create a torque differential between said rotors.

3. In a helicopter having two load sustaining rotors turning in opposite directions, means including a yaw control device for controlling the directional heading of the helicopter while maintaining the combined lift of said rotors substantially constant comprising lift producing blade tip portions of airfoil cross section which telescope relative to said blades, said tip portions normally occupying a mid position in which they are partially extended, and means for extending the blade tip portions of a rotor turning in one direction while simultaneously retracting the blade tip portions of a rotor turning in the opposite direction.

4. The combination of claim 3 in which means controlled by the pilot is provided for improving rotor aerodynamic characteristics at high speed flight and disengagement of the helicopter yaw control device by simultaneously fully retracting all the blade tip portions of both rotors.

5. In a helicopter, upper and lower counterrotating rotors, each having rotor blades provided with hollow spar members, means for increasing the lift of the blades comprising lift producing tip portions which telescope into the hollow spar members, said tip portions in normal flight being partially extended from said spar members, and means operative by the pilot in flight for effecting further extension of the tip portions of all of the blades of either rotor in unison while similarly retracting the tip portions of all of the blades of the other rotor in unison.

6. In a helicopter, coaxial rotors, each having a plurality of blades, two concentric tubular shafts, means for rotating said shafts in opposite directions, means for connecting each of said shafts to one of said rotors, and means for obtaining yaw control for the helicopter by creating a torque differential between said rotors while maintaining the combined lift and torque of said rotors substantially constant including lift producing tip portions on said blades which telescope within said blades and normally occupy a mid position in which they are partially extended from said blades, pilot operative means for actuating said tip portions including a steering member movable in opposite directions from a neutral position, and differential connections between said steering member and said tip portions for extending the tip portions of all the blades of one of said rotors and retracting the tip portions of all the blades of the other rotor upon movement of said steering member in one direction from said neutral position and for extending the tip portions of all the blades of the other rotor and retracting the tip portions of all the blades of said one rotor upon movement of said steering member in the other direction from said neutral position, the extension and retraction of all of the blade tip portions being of equal radial distance.

7. In a helicopter, coaxial counterrotating rotors, each having a plurality of blades, two concentric tubular shafts, means for connecting each of said shafts to one of said rotors, means for obtaining yaw control for the helicopter by creating a torque differential between said rotors including lift producing tip portions on said blades which telescope within said blades and normally occupy a mid position in which they are partially extended from said blades, a cable reel mounted on each of said drive shafts, means for driving each cable reel at the same speed and in the same direction as the shaft on which it is mounted, cables attached at one end to said blade tip portions and extended through hollow spars in said blades into said tubular shafts, said cables having their unattached ends wound onto the reels of their respective drive shafts, pilot operative means for actuating said blade tip portions including a steering member movable in opposite directions from a neutral position, and differential connections between said steering member and said tip portions for extending the tip portions of one of said rotors and retracting the tip portions of the other rotor upon movement of said steering member in one direction from said neutral position and for extending the tip portions of the blades of the other rotor and retracting the tip portions of said one rotor upon movement of said steering member in the other direction from said neutral position.

8. In a helicopter, coaxial counterrotating rotors, each having a plurality of blades, two concentric tubular shafts, means for connecting each of said shafts to one of said rotors, means for obtaining yaw control for the helicopter by creating a torque differential between said rotors including lift producing tip portions on said blades which telescope within said blades and normally occupy a mid position in which they are partially extended from said blades, a cable reel mounted on each of said drive shafts, means for driving each cable reel at the same speed and in the same direction as the shaft on which it is mounted, cables attached at one end to said blade tip portions and extended through hollow spars in said blades into said tubular shafts, said cables having their unattached ends wound onto the reels of their respective drive shafts, pilot operative means for actuating said blade tip portions including a steering member movable in opposite directions from a neutral position, and differential connections between said steering member and said tip portions for extending the tip portions of one of said rotors and retracting the tip portions of the other rotor upon movement of said steering member in one direction from said neutral position and for extending the tip portions of the blades of the other rotor and retracting the tip portions of said one rotor upon movement of said steering member in the other direction from said neutral position, said cable reels being mounted on their respective shafts on bearings permitting limited rotational adjustment relative to said shafts, and said differential connections including means for adjusting said reels on their bearings to effect the differential extension and retraction of the blade tip portions of the two rotors.

9. The combination of claim 8 in which the differential connections include planetary gearing actuated by said steering member for adding an increment of rotation to the rotating reels in one direction or the other to effect the differential extension and retraction of the blade tip portions of the two rotors.

* * * * *